US005620776A

United States Patent [19]

Schulz

[11] Patent Number: 5,620,776

[45] **Date of Patent: *Apr. 15, 1997**

[54] EMBOSSED TISSUE PRODUCT WITH A PLURALITY OF EMBOSS ELEMENTS

[75] Inventor: Galyn A. Schulz, Appleton, Wis.

[73] Assignee: James River Corporation of Virginia, Richmond, Va.

[ * ] Notice: The term of this patent shall not extend beyond the expiration date of Pat. No. 5,573,830.

[21] Appl. No.: 416,348

[22] Filed: Apr. 4, 1995

Related U.S. Application Data

[63] Continuation-in-part of Ser. No. 169,628, Dec. 20, 1993, and Ser. No. 999,414, Dec. 24, 1992, Pat. No. 5,436,057.

[51] Int. Cl.[6] .......... D04H 1/64; B32B 31/20; B32B 3/30

[52] U.S. Cl. .......... 428/156; 428/220; 428/338; 428/215; 428/213; 428/152; 428/153; 428/154; 428/162; 428/163; 428/165; 428/167; 428/171; 428/172; 428/174; 428/179; 428/175; 428/181; 428/187; 428/537.5; 428/906; 162/117; 162/118; 162/109; D5/39; D5/37; D5/53; D5/58

[58] Field of Search .......... 428/200, 338, 428/245, 213, 152, 153, 154, 156, 162, 163, 165, 167, 171, 172, 174, 179, 175, 181, 187, 537.5, 906; 162/117, 118, 109; D5/39, 37, 53, 58

[56] References Cited

U.S. PATENT DOCUMENTS

| | | | |
|---|---|---|---|
| D. 40,254 | 9/1909 | Zschaemisch | D5/99 |
| D. 63,343 | 11/1923 | Vanderqaw et al. | D5/57 |
| D. 64,690 | 5/1924 | Schwarz | D5/37 |
| D. 77,398 | 1/1929 | De Lancy | D5/59 |
| D. 117,018 | 10/1939 | Turpan | D5/37 |
| D. 154,696 | 8/1949 | Mitschke | D5/37 |
| D. 167,528 | 8/1952 | Odzer | D5/37 |
| D. 179,699 | 2/1957 | Sadinoff | D5/39 |
| D. 184,493 | 2/1959 | Scheiding | D5/57 |
| D. 184,878 | 4/1959 | Korkovius | D5/53 |
| D. 213,661 | 3/1969 | Hicks | D5/59 |
| D. 231,019 | 3/1974 | Gilling et al. | D5/59 |
| D. 231,021 | 3/1974 | Gilling et al. | D5/53 |
| D. 239,137 | 3/1976 | Appleman | D5/53 |
| D. 288,150 | 2/1987 | Schulz et al. | D5/53 |
| D. 298,588 | 11/1988 | Peddada | D5/57 |
| D. 319,349 | 8/1991 | Schultz et al. | D5/53 |
| 361,844 | 4/1887 | Taylor | 162/117 |
| 496,964 | 5/1893 | Wheeler | D5/53 |
| 497,421 | 5/1893 | Wheeler | D5/57 |
| 2,121,013 | 6/1938 | Brown | 428/181 |
| 2,954,838 | 10/1960 | Nuorivaara | 116/156 |
| 3,240,656 | 3/1966 | Faircloth | 428/175 |
| 4,307,141 | 12/1981 | Walbrun | 428/178 |
| 4,320,162 | 3/1982 | Swchulz | 428/154 |
| 4,339,099 | 7/1982 | Niedermeyer | 245/1 |
| 4,483,728 | 11/1984 | Bauernfeind | 428/172 |
| 4,659,608 | 4/1987 | Schulz | 428/406 |
| 4,671,983 | 6/1987 | Burt | 428/171 |
| 4,759,967 | 7/1988 | Bauernfeind | 428/154 |
| 4,803,032 | 2/1989 | Schulz | 162/117 |
| 4,927,588 | 5/1990 | Schulz | 162/117 |
| 5,158,819 | 10/1992 | Goodwin, Jr. et al. | 428/131 |
| 5,436,057 | 7/1995 | Schulz | 162/118 |

FOREIGN PATENT DOCUMENTS

| | | |
|---|---|---|
| 9423128 | 10/1994 | WIPO . |

*Primary Examiner*—William Watkins
*Attorney, Agent, or Firm*—Finnegan, Henderson, Farabow, Garrett & Dunner, L.L.P.

[57] ABSTRACT

An embossed tissue having improved bulk and puffiness while being non-nesting by having a lattice pattern and at least two signature bosses. More particularly, one of the signature bosses is defined by embossments having a lower portion which is continuous and an upper portion which is defined by crenels and merlons.

20 Claims, 12 Drawing Sheets

EMBOSSED TISSUE PRODUCT WITH A PLURALITY OF EMBOSS ELEMENTS

RELATED APPLICATIONS

This application is a continuation-in-part of U.S. patent application Ser. No. 08/169,628, filed Dec. 20, 1993, now pending. This application is also a continuation-in-part of U.S. patent application Ser. No. 07/999,414, filed Dec. 24, 1992, now U.S. Pat. No. 5,436,057. Both of these applications are incorporated by reference herein, in their entirety.

FIELD OF THE INVENTION

The present invention relates to an embossed web or sheet exhibiting high bulk and good emboss pattern definition. The invention further relates to a uniform roll of embossed tissue. In still another aspect, the present invention relates to an embossed element having a cross section including crenels and merlons.

BACKGROUND OF THE INVENTION

Tissue produced using conventional wet press technology must usually be embossed subsequent to creping to improve bulk, appearance and softness. It is known in the art to emboss sheets comprising multiple plies of creped tissue to increase the surface area of the sheets thereby enhancing their bulk and moisture holding capacity. Toilet tissue is usually marketed in rolls, containing a specified number of sheets per roll. Tissue embossed in conventional patterns of spot debossments, when packaged in roll form, exhibit a tendency to be non-uniform in appearance often due to uneven buildup of the bosses as the sheet is wound onto the roll. This results in a ridging effect detracting from the appearance of the rolls.

Embossing patterns and methods that emboss products in manner selected to avoid nesting of the bosses in rolled, folded or stacked sheets of paper product are known. For one example of such a pattern and method, see U.S. Pat. No. 4,659,608. This prior art pattern, while improving the nesting problem associated with previous prior art patterns, to only four location, was faced with a spiralling effect similar to the visual spinning of a barber shop pole. In addition, this prior art pattern wrinkles and ridges due to stresses placed upon the boss pattern.

The present invention minimizes this buildup and ridging problem while improving the bulk of the tissue product. The pattern which is formed in the tissue of the present invention may be formed either by debossing or embossing. When an emboss pattern is formed, the reverse side of the sheet retains a deboss pattern. The projections which are formed are referred to as bosses. When a deboss pattern is formed, the reverse side of the sheet retains an emboss pattern and the projections are still referred to as bosses. Thus, the methodologies may be interchanged while producing the same product.

SUMMARY OF THE INVENTION

The present invention provides an embossed paper product which is significantly higher in bulk than prior art products. When formed into a roll, the embossed paper products of the present invention has superior roll compression and improved roll structure. Furthermore, the embossing process as described in the present invention requires less penetration depth than prior art emboss techniques resulting in improved life for the embossing rolls and machinary used. In addition, the embossed product of the present invention does not suffer from the disadvantages of the prior art products due to substantial nesting of the boss patterns resulting in uneven and poor roll quality.

To achieve the foregoing advantages and in accordance with the purpose of the invention, as embodied and broadly described herein, there is disclosed:

A sheet of tissue exhibiting puffiness and bulk having a plurality of bosses formed therein comprising;

a plurality of stitch-like bosses arrayed to form polygonal cells making up a lattice structure; and a plurality of bosses forming a first signature boss pattern being centrally arrayed within a plurality of cells, said first signature bosses being formed of linear continuous embossments at a height exceeding 3 thousandths of an inch and a height less than 120 thousandths of an inch;

a plurality of bosses forming a second signature boss pattern being centrally arrayed within a plurality of cells, said second signature boss pattern being formed of linear crenulated embossments at a height exceeding 3 thousandths of an inch and a height less than 120 thousandths of an inch and defining a plurality of merlons and crenels, wherein said crenels extend to a depth of at least 2 thousandths of an inch.

There is further disclosed:

A roll of tissue exhibiting puffiness and bulk having a plurality of bosses formed therein comprising:

an array of stitch-like bosses forming a lattice of polygonal cells;

each said polygonal cell being centrally filled with a plurality of bosses forming one of a multiplicity of signature boss patterns comprising at least a first signature boss pattern and a second signature boss pattern, said first signature boss pattern being non-nesting with said second signature emboss pattern, said bosses being arrayed such that one of said first signature bosses nests with another of said first signature bosses at no more than three locations within said roll and one of said second signature boss nests with another of said second signature bosses at no more than three locations within said roll.

There is still further disclosed:

A nonwoven fibrous web having an emboss element thereon comprising:

a nonwoven fibrous web the majority thereof defining a base plane;

a crenulated emboss element formed therein and extending upwardly from said base plane, said crenulated emboss element having an upper and a lower portion;

said lower portion being continuous between said base plane and a first plane, said first plane defining the upper edge of said lower portion and the lower edge of said upper portion; and said upper portion having crenels and merlons extending between a second plane defining the uppermost edge of said element and said first plane, said crenels and merlons being spaced along the upper edge of said lower portion of said crenulated emboss element.

There is finally disclosed:

A sheet of tissue exhibiting puffiness and bulk having a plurality of bosses formed therein comprising;

a plurality of stitch-like bosses arrayed to form polygonal cells making up a lattice structure; and a plurality of bosses forming a first signature boss pattern being centrally disposed within a plurality of cells, said plurality of bosses having a height exceeding 3 thousandths of an inch and a height less than 120 thousandths of an inch;

a plurality of bosses forming a second signature boss pattern being centrally disposed within a plurality of cells, said second signature boss pattern being formed of at least two concentrically arranged arrays of embossments at a height exceeding 3 thousandths of an inch and a height less than 120 thousandths of an inch.

Additional advantages of the invention will be set forth in part in the description which follows, and in part will be apparent from the description, or may be learned by practice of the invention. The objects and advantages of the invention will be realized and attained by means of the elements and combination particularly pointed out in the appended claims.

The accompanying drawings, which are incorporated in and constitute a part of the specification, illustrate various aspects of the invention and, together with the description, serve to explain the principles of the invention.

DESCRIPTION OF THE PREFERRED EMBODIMENTS

The present invention is a paper product having improved bulk and superior pattern definition characteristics while minimizing substantial nesting of the emboss patterns resulting in a product having superior roll quality.

The paper product of the present invention is made up of a nonwoven fibrous web, more preferably a tissue, having an emboss pattern formed thereon.

In one embodiment of the present invention, the product may include a first set of bosses which resemble stitches, hereinafter referred to as stitch-like bosses which resemble dot, dashes or the like, and at least one second set of bosses which are referred to as signature bosses. Signature bosses may be made up of any emboss design and are often a design which is related by consumer perception to the particular manufacturer of the tissue.

The diameter of the stitch-like boss is preferably at least one and one half times the line width of the continuous or crenulated signature bosses. More preferably, the diameter is two or three times the line width. When said stitch-like bosses resemble dashes, they preferably have an aspect ratio of less than 5. Aspect ratio refers to the ratio of length to width.

In another aspect of the present invention, a paper product is embossed with a wavy lattice structure which forms polygonal cells. These polygonal cells may be diamonds, hexagons, octagons, or other readily recognizable shapes. In one preferred embodiment of the present invention, each cell is filled with a signature boss pattern. More preferably, the cells are alternatively filled with at least two different signature emboss patterns.

Figure 1:
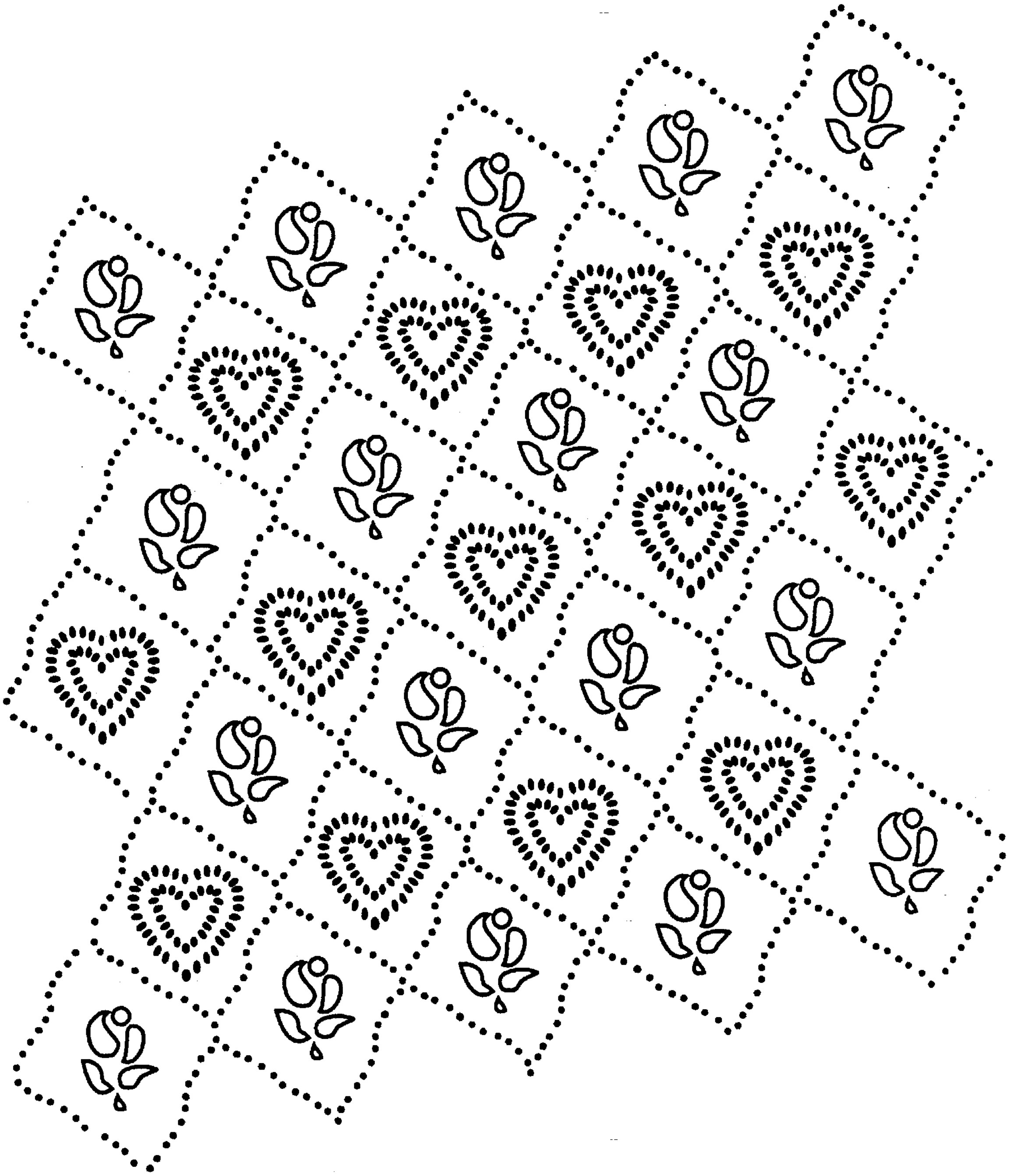
FIG. 1 is a top plan view of one emboss pattern of the present invention.

In another preferred embodiment, one of the signature emboss patterns is made up of concentrically arranged elements. These elements can include like elements for example, a large circle around a smaller circle or differing elements, for example a larger circle around a smaller heart. In a most preferred embodiment of the present invention, at least one of the signature emboss patterns are concentrically arranged hearts as can be seen in FIG. 1. In the most preferred embodiment, the other signature emboss element is a flower.

The embossed paper product of the present invention improves over the prior art product in a number of characteristics. The use of concentrically arranged emboss elements in one of the signature emboss patterns adds to the puffiness effects realized in the appearance of the paper product tissue. The puffiness associated with this arrangement is the result not only of appearance but also of an actual raising of the tissue upward between the two concentric elements.

In one embodiment of the present invention, emboss elements are formed having the uppermost portions thereof formed into crenels and merlons, herein after referred to as "crenulated emboss elements". By analogy, the side of such an emboss element would resemble the top of a castle wall having spaced projections which are merlons and depressions therebetween which are crenels. Crenulated emboss elements have the advantages of adding high bulk to the paper substrate and further providing enhanced definition and pattern retention to the embossed pattern.

Any of the emboss elements either stitchlike or signature may be formed of crenulated emboss elements. In a preferred embodiment, at least one of the signature emboss patterns is formed of crenulated emboss elements. More preferably, the signature boss pattern is two concentrically arranged hearts, one or both of which is crenulated.

The crenels may be placed in a patterned arrangement of they may be randomly spaced both in the longitudinal and cross-sectional directions. In one preferred embodiment, the crenels are uniformly spaced in both the cross-sectional and longitudinal directions. In another preferred embodiment, the crenels are longitudinally spaced along the periphery of the emboss element. In still another preferred embodiment, the crenels are arranged in a pattern of clusters which vary in number. Finally, in another preferred embodiment, the crenels are arranged randomly on the emboss element. It is understood that the skilled artisan can arrange the crenels in any manner which achieves the objectives of bulk, absorbency and feel desired for the particular application.

The crenels preferably have a width between 2 and 40 thousandths of an inch, more preferrably between 5 and 25 thousandths of an inch. The merlons preferably have a width of from 2 to 40 thousandths of an inch, more preferably from 5 to 25 thousandths of an inch.

In a preferred embodiment of the present invention, the signature bosses have a height of between 3 thousandths and 120 thousandths of an inch, more preferably between 5 and 100 thousandths of an inch, still more preferably 40 to 80 thousandths and most preferably 50 to 70 thousandths of an inch. The crenels are preferably at a depth of at least 2 thousandths of an inch, more preferably at least 3 thousandths of an inch. In one embodiment of the present invention, the crenels can be of a depth which approaches the depth of the emboss element, i.e., the crenel extends substantially to the base plane or web. The crenels are preferably at a depth of less than 30 thousandths of an inch and most preferably at less than 15 thousandths of an inch. It is understood that the use of merlons which are unequally spaced or which differ in height are embraced within the present invention.

According to the one embodiment of the present invention, when the web or sheets are formed into a roll, the tissue is aligned so that the bosses are internal to the roll and the debossed side of the tissue is exposed. In the present invention, the boss pattern is offset from the machine direction in the cross direction, the machine direction being parallel to the free edge of the web, by more than 0° to less than 180°, preferably more than 10° to less than 170°.

In one embodiment of the present invention, the boss pattern combines stitch-like bosses with a first signature boss made up of linear continuous embossments and a second signature boss pattern made up of crenulated embossments. The overall arrangement of the pattern is selected so that when the sheets are formed into a roll, the signature bosses fully overlap at a maximum of three location in the roll, more preferably at two locations, the outermost of these being at least a predetermined distance, e.g., about an eighth of an inch, inward from the exterior surface of the roll. Moreover, the overall average boss density is substantially uniform in the machine direction of each strip in the roll. The combined effect of this arrangement is that the rolls possess very good roll structure and very high bulk.

The signature bosses are substantially centrally disposed in the cells formed by the intersecting flowing lines and serve to greatly enhance the bulk of the tissue while also enhancing the distortion of the surface thereof. At least some of the signature bosses are continuous rather than stitch-like and can preferably be elongate. Other of the signature bosses are crenulated and are also substantially centrally disposed in cells formed by the intersecting flowing lines. The signature bosses enhance the puffy or filled appearance of the sheet both by creating the illusion of shading as well as by creating actual shading due to displacement of the sheet apparently caused by puckering of the surrounding regions due to the embossing or debossing of the signature bosses.

During production trials, a single heart design was produced using a single continuous embossment. The continuous embossment heart was replaced with a single crenulated heart, which provided significant improvements in bulk. Finally, the single heart was replaced with a double heart design comprised of one heart concentrically disposed within a second larger heart. This double heart pattern used crenulated emboss elements for both hearts. The double heart pattern achieved a further improvement in bulk and as described above was perceived as puffier by the displacement of the web upward between the two concentric elements.

FIG. 1 illustrates a preferred emboss pattern according to the present invention. The pattern includes first signature bosses (tulips) and second signature bosses (double hearts) which are included within a criss-cross pattern of wavy lines which define polygonal cells having a diamond shape. As can be seen from FIG. 1, the wavy lines are formed from stitch-like or dot-like bosses. As is also clear from FIG. 1, when the emboss pattern is applied to a paper product, the pattern is offset at an angle from the machine direction. This offset prevent substantial nesting of similar signature bosses.

Figure 2:
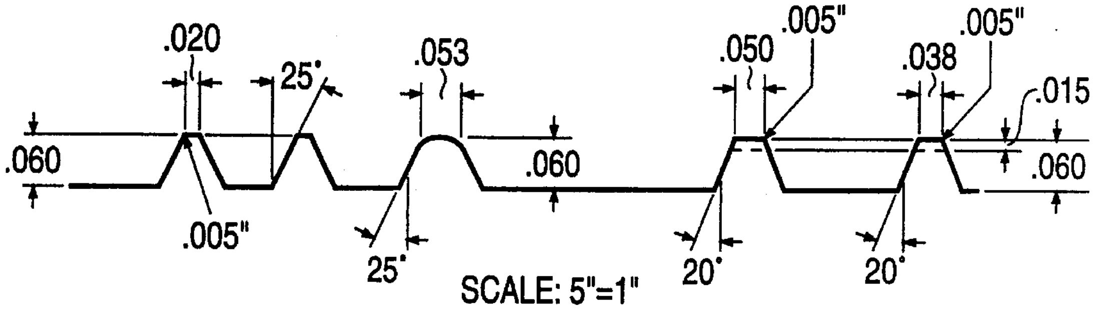
FIG. 2 is a cross sectional view of the pattern of FIG. 1.

FIG. 2 is a cross-sectional view of the pattern as illustrated in FIG. 1. The cross section includes one embossment of the flower (two sides), one stitch-like boss of the lattice-like pattern and both the interior and exterior heart patterns. Accordingly, viewing the cross section from left to right, the first two elements are part of the continuous element which makes up one part of the tulip pattern. The next, rounder element is a stitch-like element which makes up the wavy lattice pattern. Finally, the last two elements are the exterior and interior hearts, respectively. The values given are emboss depths in thousandths of an inch for one preferred embodiment according to the present invention.

Figure 3:
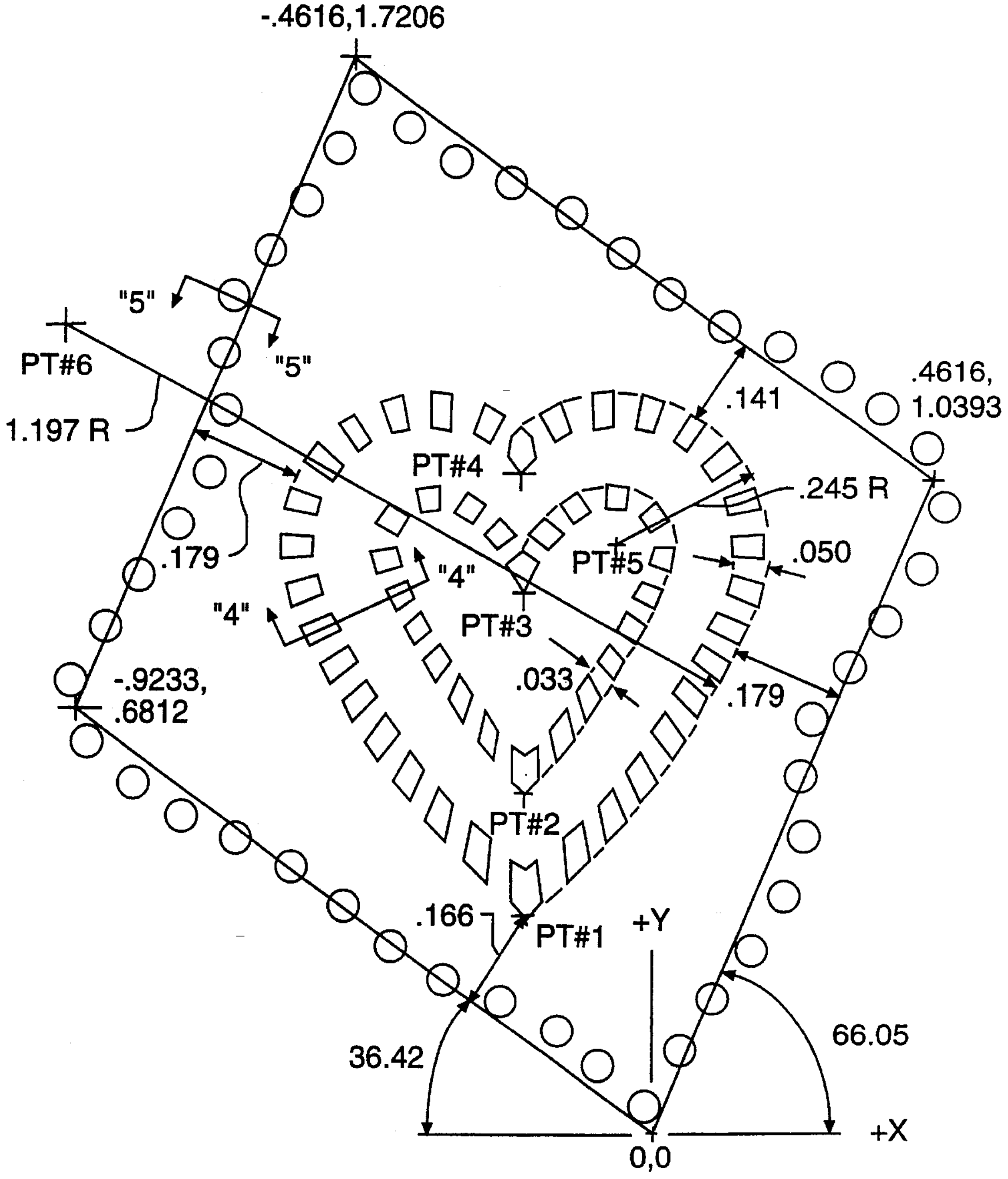
FIG. 3 is a top plan view of one signature boss of the emboss pattern of FIG. 1.

FIG. 3 illustrates a single diamond element of the lattice structure of the pattern illustrated in FIG. 1, containing a double heart. Views 4—4 and 5—5 are set forth in FIGS. 4 and 5, respectively. In FIG. 3, the rectangular coordinates for points 1–6 which define the double heart pattern in a preferred embodiment of the present invention are set forth in Table 1, below:

TABLE 1

| PT # | Rectangular Coordinates |
|---|---|
| 1 | –.1953,.3532 |
| 2 | –.1972,.5447 |
| 3 | –.1972,.8580 |
| 4 | –.1972,1.0463 |
| 5 | –0.538,.9252 |
| 6 | –.9295,1.2993 |

Figure 4:
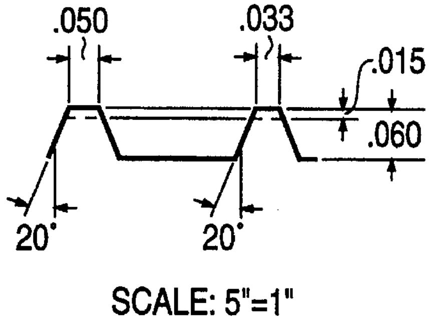
FIG. 4 is a cross-sectional view of a signature boss of FIG. 3.

FIG. 4 illustrates a cross-sectional view of the embossments of both hearts in the double heart design. The dotted lines represent partial depth between heart elements. The values given refer to emboss depths for the elements in one preferred embodiment of the present invention. The tightest bottom gap was measured at 0.013".

Figure 5:
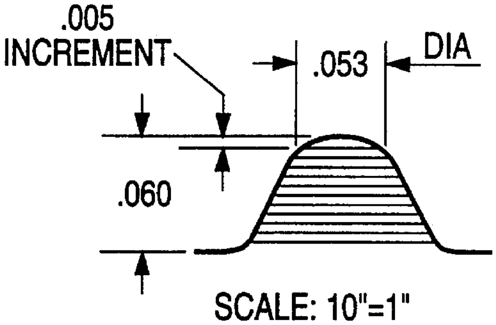
FIG. 5 is a cross-sectional view of a stitch-like boss.

FIG. 5 illustrates a cross-sectional view of a stitch-like embossment which forms the polygonal cell pattern. The diameter of the embossment has been measured from the apex in 0.005 inch increments to the depth of the boss of 0.050 inches. The diameters of the stitch-like embossment are set forth below in Table 2:

TABLE 2

| Depth | Sectioned Dot Diameter |
|---|---|
| .005 | .051 |
| .010 | .063 |
| .015 | .068 |
| .020 | .073 |
| .025 | .078 |
| .030 | .082 |
| .035 | .087 |
| .040 | .092 |
| .045 | .096 |
| .050 | .101 |
| .055 | .106 |

Figure 6:
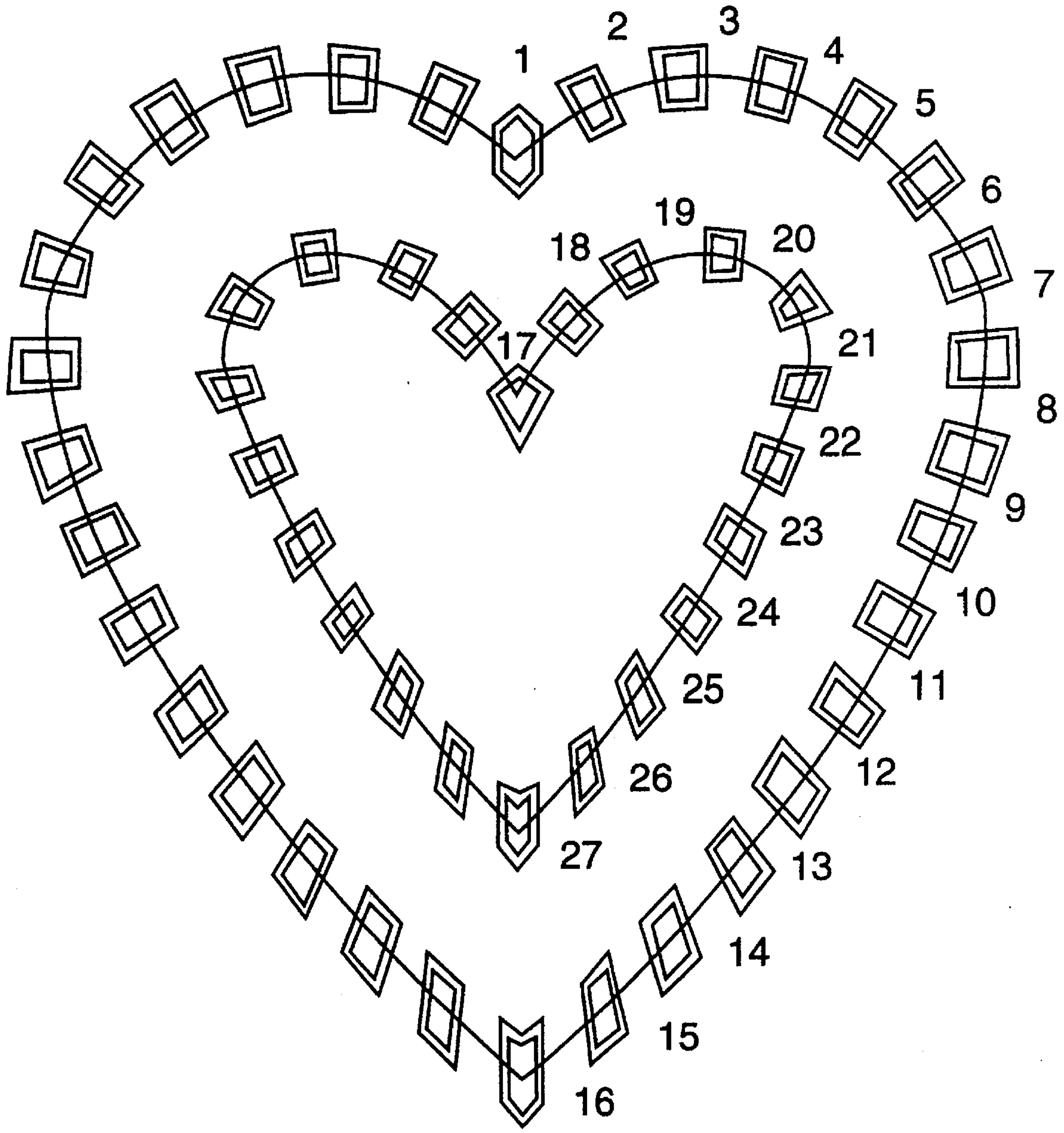
FIG. 6 is a depiction of the boss elements of the signature boss of FIG. 3.

FIG. 6 illustrates the double heart emboss pattern of a preferred embodiment of the present invention. The distance between the bottoms of each element were measured at a depth of 15 thousandths of an inch. The distances are given in Table 3 below. The distances are set forth in inches.

TABLE 3

| Point | Distance | Point | Distance |
|---|---|---|---|
| 1 | .0196 | 15 | 0.0203 |
| 2 | .0196 | 16 | .0196 |
| 3 | .0192 | 17 | .0224 |
| 4 | .0192 | 18 | .0129 |
| 5 | .0188 | 19 | .0160 |
| 6 | .0183 | 20 | .0135 |
| 7 | .0217 | 21 | .0145 |
| 8 | .0222 | 22 | .0193 |
| 9 | .0228 | 23 | .0223 |
| 10 | .0229 | 24 | .0226 |
| 11 | .0226 | 25 | .0216 |
| 12 | .0226 | 26 | .0204 |
| 13 | .0220 | 27 | .0189 |
| 14 | .0214 | | |

Figure 7:
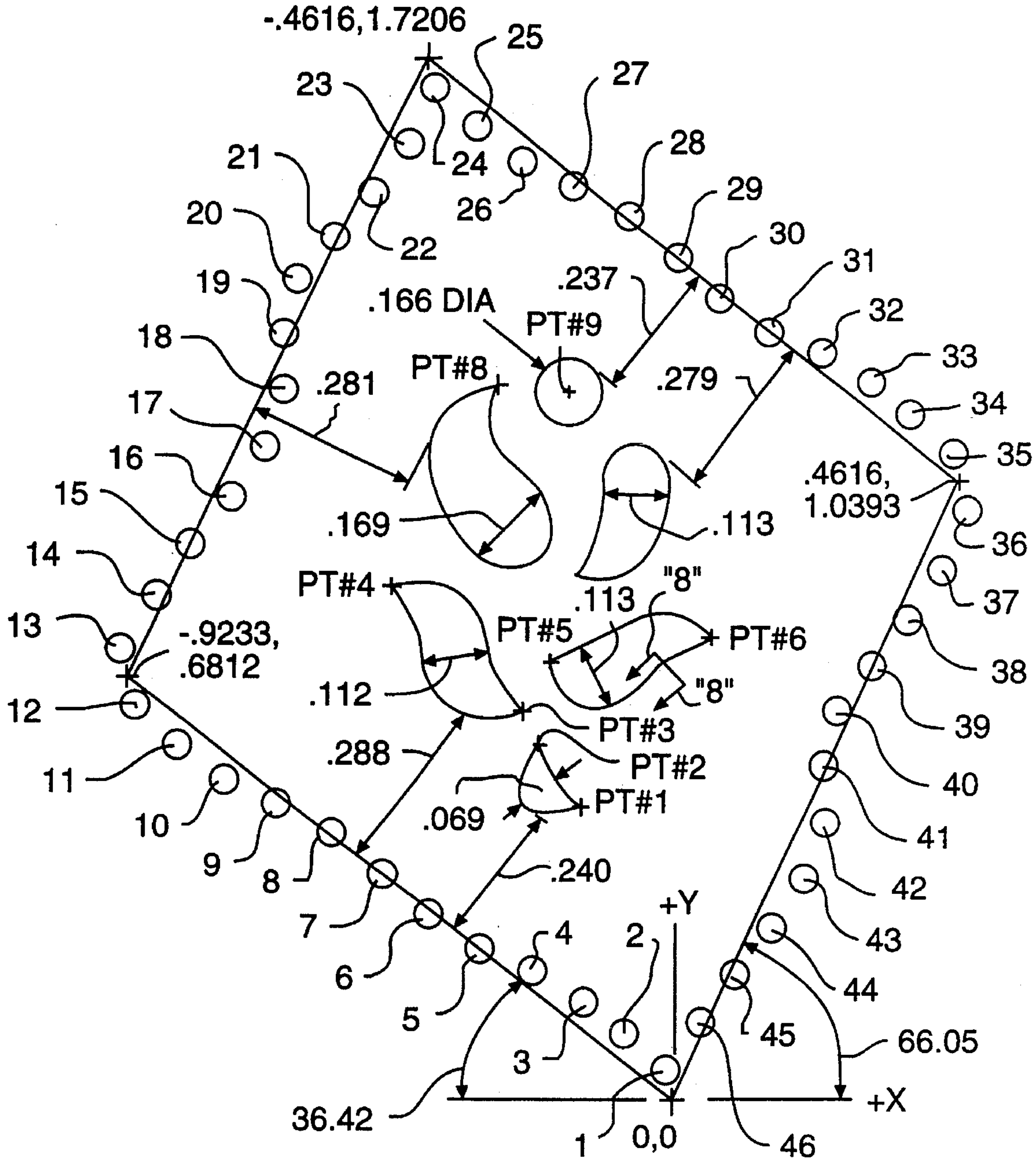
FIG. 7 is a top plan view of another signature boss of the emboss pattern of FIG. 1.

FIG. 7 illustrates a single diamond element of the lattice structure of the pattern illustrated in FIG. 1, containing a tulip. View 8—8 is set forth in FIG. 8. All measurements set forth on FIG. 7 are set forth in inches. In FIG. 7, the rectangular coordinates for points 1–9 which define the tulip pattern in this preferred embodiment are set forth in Table 4, below:

TABLE 4

| Point # | Rectangular Coordinates |
|---|---|
| 1 | −.1709,.4963 |
| 2 | −.2463,.5976 |
| 3 | −.2771,.6501 |
| 4 | −.4982,.8486 |
| 5 | −.2304,.7340 |
| 6 | .0467,.7845 |
| 7 | −.1884,.8766 |
| 8 | −.3286,1.1910 |
| 9 | −.2135,1.1849 |

The dots 1–46 in this Figure correspond to the rectangular coordinates as set forth in Table 5, below:

TABLE 5

| Dot | Rectangular Coordinates | Dot | Rectangular Coordinates | Dot | Rectangular Coordinates |
|---|---|---|---|---|---|
| 1 | −.0123,.0459 | 17 | −.7093,1.0614 | 33 | .3063,1.2043 |
| 2 | −.0871,.1125 | 18 | −.6799,1.1581 | 34 | .3745,1.1519 |
| 3 | −.1553,.1650 | 19 | −.6834,1.2521 | 35 | .4493,1.0852 |
| 4 | −.2444,.2157 | 20 | −.6633,1.3417 | 36 | .4740,.9935 |

TABLE 5-continued

| Dot | Rectangular Coordinates | Dot | Rectangular Coordinates | Dot | Rectangular Coordinates |
|---|---|---|---|---|---|
| 5 | −.3339,.2503 | 21 | −.6032,4.4177 | 37 | .4358,.8979 |
| 6 | −.4205,.3032 | 22 | −.5430,1.4961 | 38 | .3803,.8149 |
| 7 | −.4954,.3697 | 23 | −.4875,1.5790 | 39 | .3201,.7365 |
| 8 | −.5794,.4366 | 24 | −.4493,1.6746 | 40 | .2600,.6606 |
| 9 | −.6732,.4828 | 25 | .3762,1.6117 | 41 | .2399,.5710 |
| 10 | −.7604,.5172 | 26 | −.2988,1.5565 | 42 | .2434,.4769 |
| 11 | −.8378,.5723 | 27 | −.2116,1.5221 | 43 | .2140,.3802 |
| 12 | −.9109,.6353 | 28 | −.1178,1.4760 | 44 | .1610,.2949 |
| 13 | −.9356,.7271 | 29 | −.0338,1.4091 | 45 | .0985,.2165 |
| 14 | −.8802,.8148 | 30 | .0411,1.3425 | 46 | .0431,.1335 |
| 15 | −.8248,.8978 | 31 | .1278,1.2896 | | |
| 16 | −.7623,.9761 | 32 | .2173,1.2550 | | |

Figure 8:
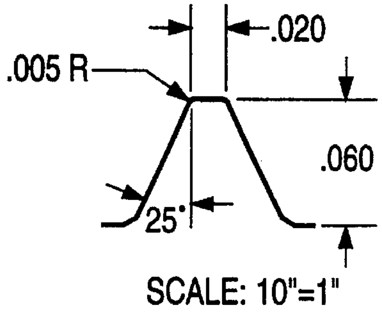
FIG. 8 is a cross-sectional view of the signature boss of FIG. 7.

FIG. 8 illustrates a cross-sectional view of one embossment of the tulip design. The values set forth in FIG. 8 are in inches.

Figure 9:
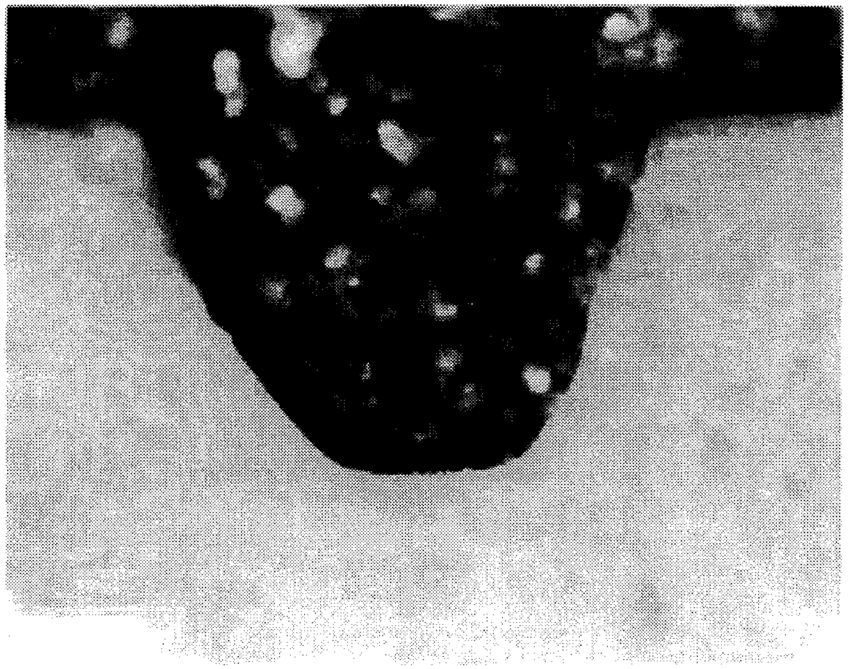
FIG. 9 is a cross-sectional view of an emboss element used in Phase I of the development of the double heart design.
Figure 10:
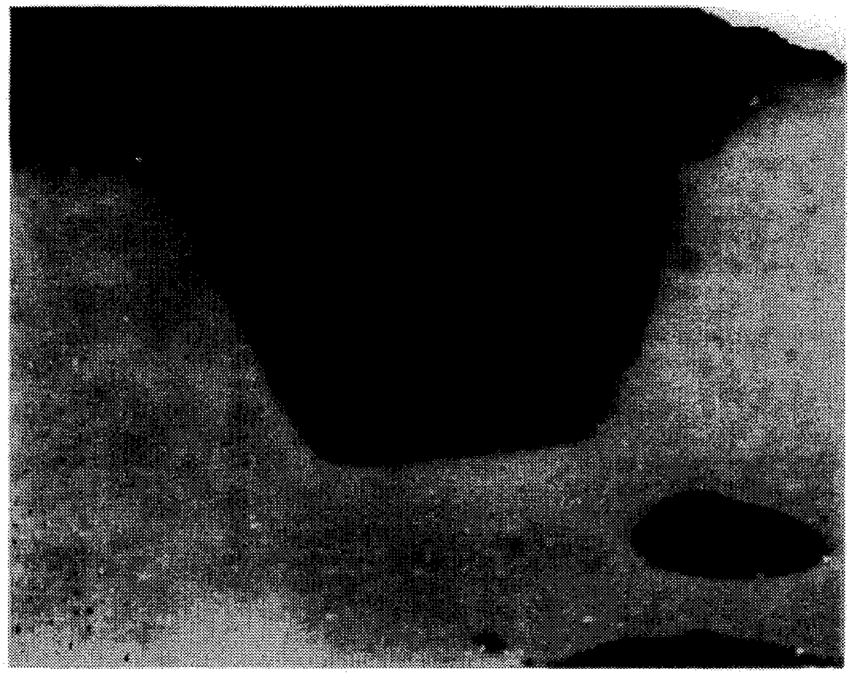
FIG. 10 is a cross-sectional view of an emboss element used in Phase II of the development of the double heart design.
Figure 11:
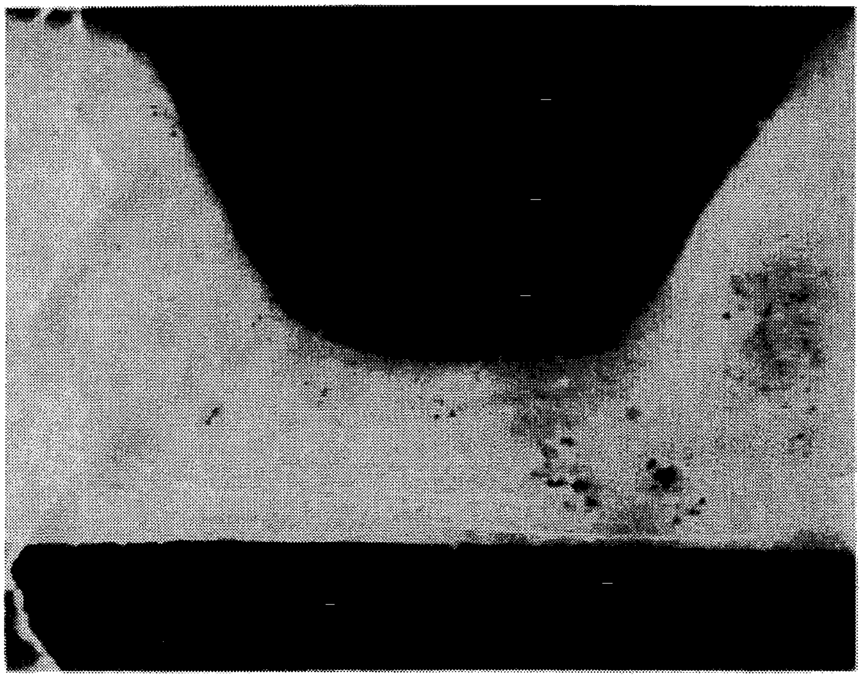
FIG. 11 is a cross-sectional view of an emboss element used in Phase III of the development of he double heart design.

FIGS. 9–11 will be described fully in the Example 3, below.

Figure 12:
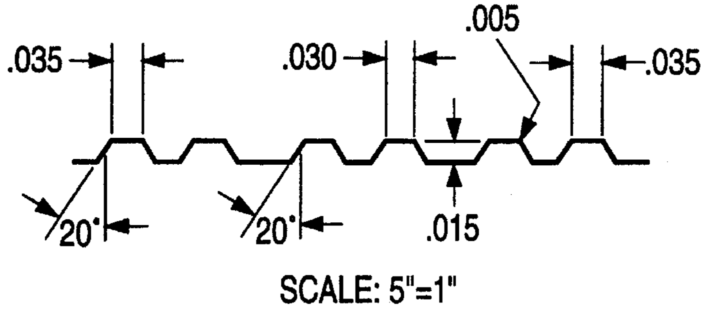
FIG. 12 is a cross-sectional view of a crenulated emboss element.

FIG. 12 is a cross sectional view of a crenulated element of the double heart emboss pattern of FIG. 3. The relative depths of the crenulations are set forth as 0.015" and the width of the top of the merlons in this preferred embodiment is either 0.030 or 0.035 inches.

Figure 13:
FIG. 13 is a photograph of the pattern of FIG. 1.

FIG. 13 is a photograph of a section of toilet tissue having the preferred pattern as set forth in FIG. 1, embossed thereon.

Figure 14:
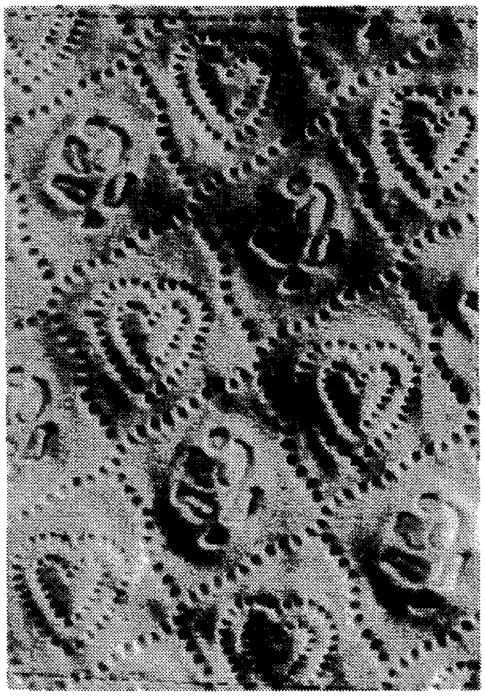
FIG. 14 is an enlarged photograph of a portion of the pattern of FIG. 1.

FIG. 14 is an enlarged photograph of a section of toilet tissue which shows the preferred pattern of FIG. 1. This photograph clearly shows that the concentrically arranged emboss elements cause the tissue to project forward. This adds to the perception of puffiness, quilting and overall softness.

Figure 15:
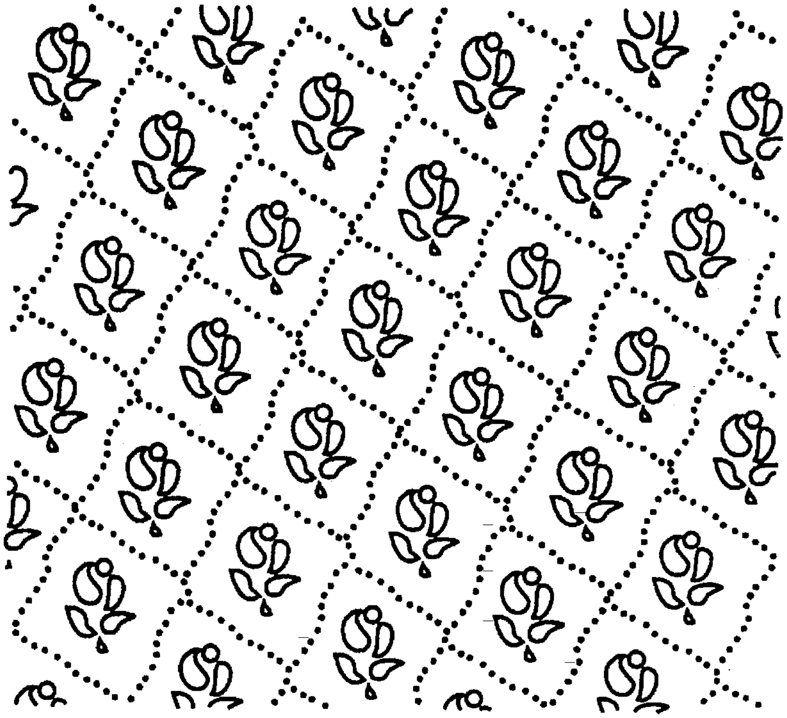
FIG. 15 is the Tulips Everywhere pattern used in the trials of Example 1.

FIG. 15 was a comparative pattern used in Example 1, below. In this pattern, tulips were placed into each cell of the lattice.

Figure 16:
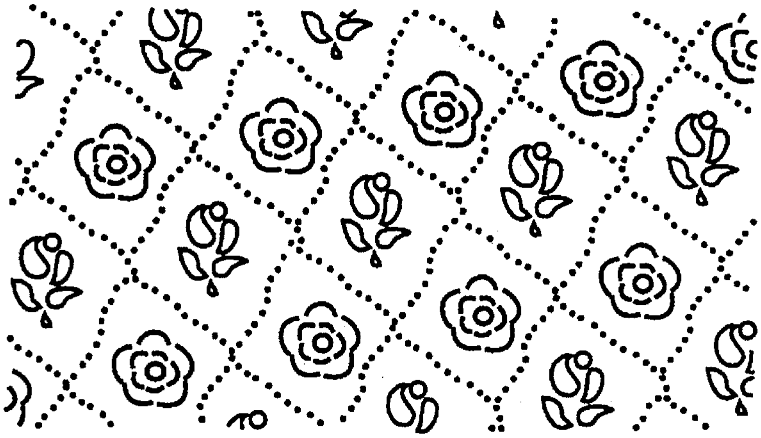
FIG. 16 is the Tulips and Roses pattern used in the trials of Example 1.

FIG. 16 is a comparative pattern used in Example 1, below. In this pattern, tulips are alternated with roses in the cells of the lattice.

Figure 17:
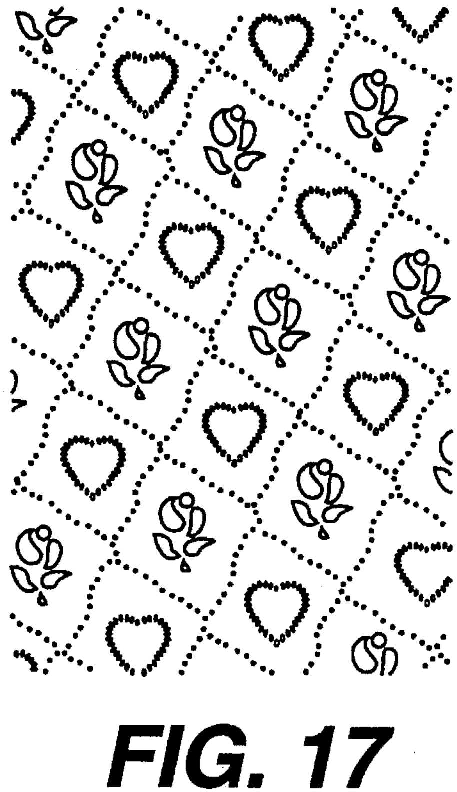
FIG. 17 is the Single Heart pattern used in the trials of Example 1.

FIG. 17 is a comparative pattern used in Example 1, below. In this pattern, tulips and single hearts are alternated within the cells of the lattice.

Figure 18:
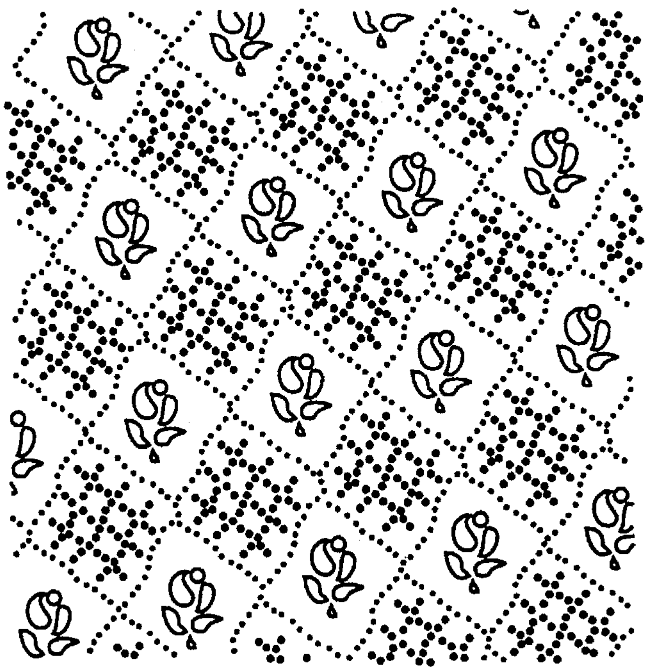
FIG. 18 is the Tulips and Stitches pattern used in the trials of Example 1.

FIG. 18 is a comparative pattern used in Example 1, below. In this pattern, cells containing tulips are alternated with cells containing a pattern of stitches.

Figure 19:
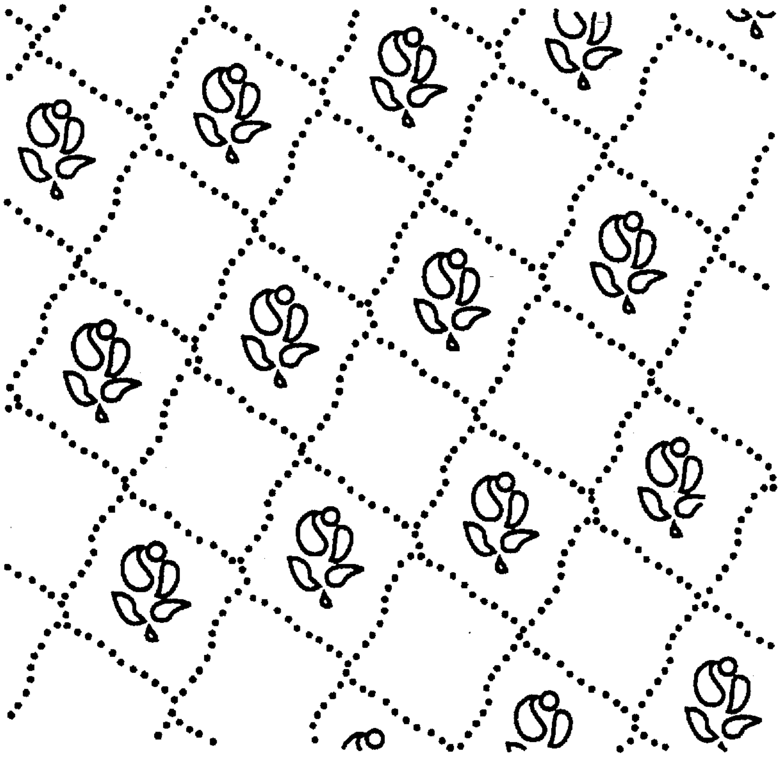
FIG. 19 is the current Northern Bathroom Tissue pattern used in the trials of Example 1.

FIG. 19 is a comparative pattern used in Example 1, below. This pattern places tulips in the cells of the lattice but leaves each alternating cell empty. This is the current commercial pattern for Quilted Northern Bathroom Tissue.

Figure 20:
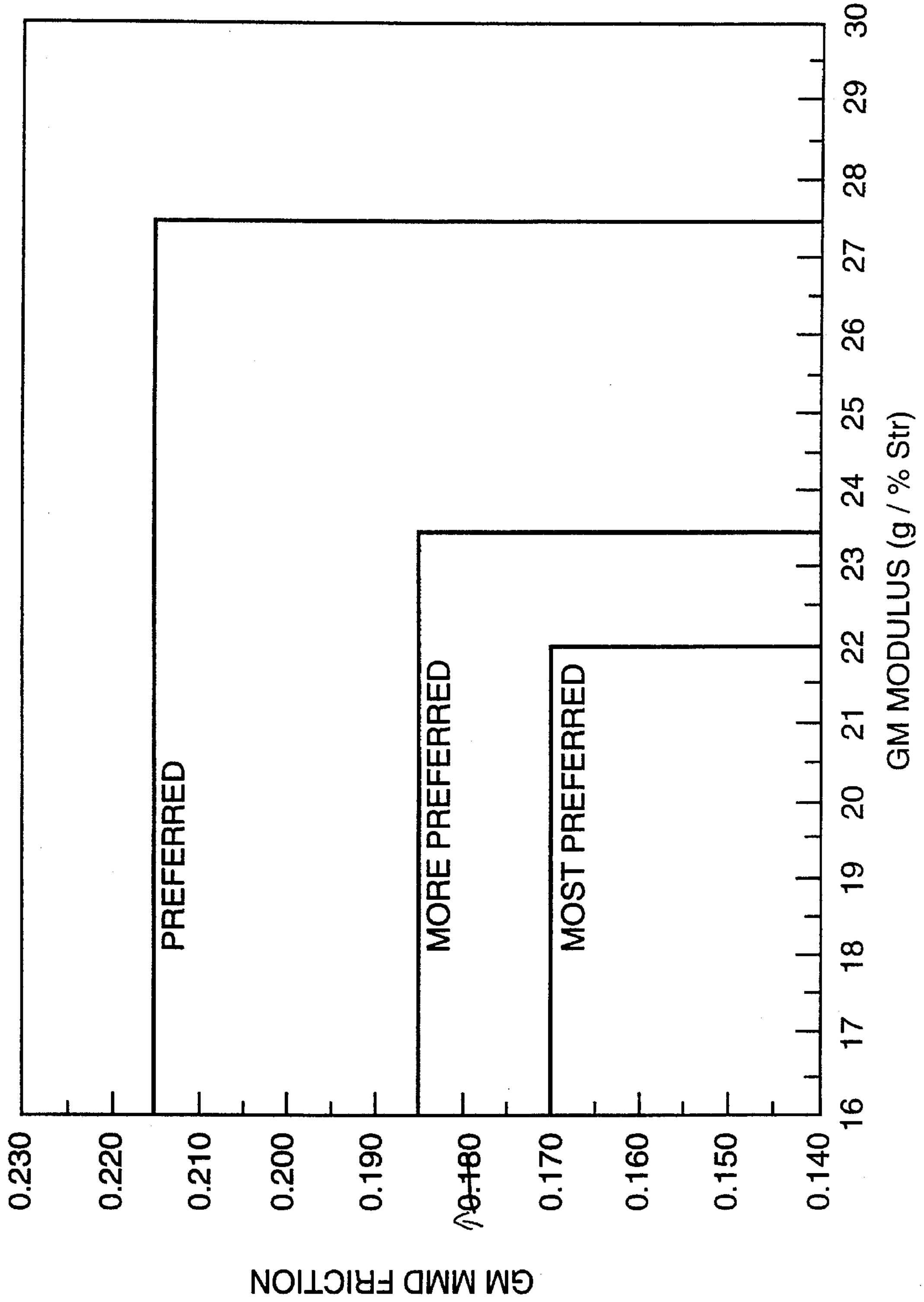
FIG. 20 is a general comparison of GM MMD Friction versus GM Modulus.

FIG. 20 is a graph that sets forth the general relationship between GM Friction and GM Modulus. As can be seen from the graph, a low friction and a low modulus are both preferred, however, a gain in one may be offset by a loss in the other.

The following examples are not to be construed as limiting the invention as described herein.

EXAMPLES

Example 1

In assessing the feasibility of a change in the pattern for Quilted Northern Bathroom tissue, six patterns were selected and visual testing was conducted.

The six patterns which were selected are exemplified in FIGS. 1, and 15–19. FIG. 1 is the preferred pattern of the present invention. FIG. 19 is the current commercial pattern for Northern Bathroom tissue.

After the patterns were selected, the patterns were laser engraved into hard plastic plates and transferred under pressure to sheets of tissue. The double heart pattern was crenulated, however, depth of emboss and caliper cannot be used for comparison purposes because they differ between laser engraved plastic plates as used in the trial and steel rolls which are used to produce commercial products. The interrelation of these two variables is demonstrated below for steel rolls (See example 3).

These sheets were then placed before consumers who were instructed not to touch them, and a series of questions ensued.

The results of these tests are set forth in Tables 6 and 7 below.

TABLE 6

Design Attribute Ratings
% Rated Best/Second Best
Total No. of Respondents = 300

| | Current | Double Heart | Single Heart | Tulips Everywhere | Tulips & Roses | Tulips & Stitches |
|---|---|---|---|---|---|---|
| Key Attributes | % | % | % | % | % | % |
| Attractive | 33 | 42 | 37 | 26 | 25 | 20 |
| Puffy | 26 | 44 | 33 | 25 | 27 | 25 |
| Quilted | 23 | 45 | 34 | 19 | 24 | 31 |
| Thick | 26 | 35 | 30 | 25 | 26 | 27 |
| Second Attributes | % | % | % | % | % | % |
| Approp. for Quilt. Northern | 33 | 36 | 33 | 29 | 27 | 20 |
| Soft | 34 | 34 | 33 | 27 | 25 | 22 |
| Comfort | 34 | 37 | 31 | 28 | 24 | 25 |
| Absorbent | 29 | 38 | 33 | 27 | 23 | 23 |
| Cushiony | 27 | 40 | 30 | 21 | 24 | 27 |
| Strong | 26 | 42 | 29 | 24 | 24 | 28 |

TABLE 7

Design Attribute Ratings
% Rated Excellent/Very Good
Total No. of Respondents = 300

| | Current | Double Heart | Single Heart | Tulips Everywhere | Tulips & Roses | Tulips & Stitches |
|---|---|---|---|---|---|---|
| Key Attributes | % | % | % | % | % | % |
| Attractive | 50 | 57 | 57 | 58 | 55 | 40 |
| Puffy | 43 | 62 | 57 | 54 | 54 | 46 |
| Quilted | 44 | 63 | 61 | 53 | 59 | 51 |
| Thick | 42 | 54 | 50 | 46 | 48 | 46 |
| Second Attributes | % | % | % | % | % | |
| Approp. for Quilt. Northern | 54 | 55 | 53 | 55 | 55 | 42 |
| Soft | 51 | 55 | 53 | 51 | 52 | 42 |
| Comfort | 53 | 51 | 54 | 52 | 50 | 46 |
| Absorbent | 41 | 57 | 52 | 49 | 51 | 42 |
| Cushiony | 43 | 59 | 53 | 48 | 51 | 47 |
| Strong | 42 | 56 | 48 | 47 | 48 | 45 |

Based upon initial consumer perception, the double heart pattern was far superior to the other similar designs. Upon the success of the Double Heart/Flower pattern of FIG. 1, this pattern was selected for pilot plant trials.

In use tests conducted in the homes of consumers, the two patterns did comparably based upon the questions asked. The Double Heart/Flower pattern, however, received significantly better results when comparing voluntary comments. Based upon these results, plant trials were carried out for the double heart design.

Example 2

Plant trials were carried out to produce the Double Heart/Flower design for Northern Bathroom tissue. The physical data for the rolls produced during this trial is set forth in Table 9, below.

TABLE 9

| Product | Sheet Count | Emboss Process | Basis Weight (lbs/rm) | Caliper (mils) | MD Tensile (gm/3") | CD Tensile (gm/3") | GM Friction | GM Modulus | Roll Diameter (inches) | Roll Compression (%) | Penetration Depth (mls) |
|---|---|---|---|---|---|---|---|---|---|---|---|
| | | | Tissue Product Characteristics | | | | | | | | |
| G10 CONTROL | 280 | current commercial pattern | 18.8 | 71.9 | 1046 | 388 | 0.145 | 19.4 | 4.20 | 18.0 | 80 |
| G 37 | 280 | Double Heart/ Flower | 18.7 | 72.6 | 1065 | 417 | 0.154 | 19.0 | 4.20 | 18.5 | 47 |
| G 39 | 250 | Double Heart/ Flower | 18.7 | 75.5 | 1021 | 408 | 0.154 | 18.9 | 4.18 | 21.1 | 50 |
| G 32 | 280 | Double Heart/ Flower | 18.8 | 71.4 | 1138 | 457 | 0.156 | 22.3 | 4.19 | 17.0 | 45 |
| G 34 | 250 | Double Heart/ Flower | 18.8 | 74.9 | 1091 | 428 | 0.173 | 18.9 | 4.18 | 20.5 | 50 |
| G 13 | 280 | Double Heart/ Flower | 18.8 | 76 | 1055 | 408 | 0.173 | 20.4 | 4.17 | 14.8 | 50 |
| G 35 | 250 | Double Heart/ Flower | 18.4 | 82.6 | 999 | 393 | 0.169 | 17.7 | 4.17 | 16.8 | 55 |

In Table 9, G13 and G35 were phase I of the testing. FIG. 9 is a photomicrograph of the shape of the emboss element of Phase I. G34 and G32 were phase II of the testing. FIG. 10 is a photomicrograph of the shape of the emboss element of Phase II. G39 and G37 were phase III of the testing. FIG. 11 is a photomicrograph of the shape of the emboss element of Phase III.

The basis weight in Table 9 is a relative measure of the amount of fiber used in the production of the roll. Caliper is an indicator of the thickness of the tissue. MD tensile and CD tensile are indicators of the strength or failure of the tissue. GM friction and GM modulus are best if they are low but a rise in one may be offset by a drop in the other. Roll compression is a relative indicator of how firm a roll is perceived to be. Finally, penetration depth is the depth to which the web is embossed without reference to the element size.

As seen from the data, the tissues according to the preferred embodiments of the present invention are far superior to the control. The results achieved at the lower emboss penetration depths using the crenulated embossing technique could not be achieved with the control emboss pattern.

Other embodiments of the invention will be apparent to those skilled in the art from consideration of the specification and practice of the invention disclosed herein. It is intended that the specification and examples be considered as exemplary only, with a true scope and spirit of the invention being indicated by the following claims.

I claim:

1. A sheet of tissue exhibiting puffiness and bulk having a plurality of bosses formed therein comprising:

a plurality of stitch shaped bosses arrayed to form polygonal cells making up a lattice structure; and a plurality of bosses forming a first signature emboss pattern being centrally arrayed within a plurality of cells, said first signature bosses being formed on linear continuous embossments at a height exceeding 3 thousandths of an inch and a height less than 120 thousandths of an inch;

a plurality of bosses forming a second signature emboss pattern being centrally arrayed within a plurality of cells, said second signature bosses being formed of linear crenulated embossments at a height exceeding 3 thousandths of an inch and a height less than 120 thousandths of an inch and defining a plurality of merlons and crenels, wherein said crenels extend from the top of said adjacent merlon to a depth of at least 2 thousandths of an inch.

2. The sheet according to claim 1 having a machine-direction and a cross-machine direction, wherein the combination of lattice structure and signature bosses are offset from the machine direction.

3. The sheet according claim 2, wherein the combination is offset from about 15 to 65 degrees from the machine direction.

4. The sheet according to claim 1, wherein the continuous signature bosses have a height of about 40 to 80 thousands of an inch and the crenulated signature bosses have a height of about 40 to 80 thousands of an inch.

5. The sheet according to claim 1, wherein the stitch-shaped bosses have a height of about 40 to 80 thousands of an inch.

6. The sheet according to claim 1, wherein the diameter of the stitch-shaped boss is at least one and one half times the width of a line of the continuous or crenulated signature boss.

7. The sheet according to claim 1, wherein the diameter of the stitch-shaped boss is at least twice the width of a line of the continuous or crenulated signature boss.

8. The sheet according to claim 1, wherein the diameter of the stitch-shaped boss is at least three times the width of a line of the continuous or crenulated signature boss.

9. The sheet according to claim 1, wherein said polygonal cells are diamond shaped cells.

10. The sheet according to claim 1, wherein said sheet is approximately 3 polygonal cells wide.

11. The sheet according to claim 1, wherein the polygonal cells have generator lines which connect the apices of the polygonal cells, and wherein the center of the stitch-shaped boss farthest from the generator line is a distance equivalent to at least 1 diameter of said stitch-shaped boss but no more than 3 diameters of said stitch-shaped boss from said line.

12. The sheet according to claim 1, wherein the stitch-shaped bosses are substantially circular dots.

13. The sheet according to claim 1, wherein the stitch-shaped bosses resemble dashes.

14. The sheet according to claim 13, wherein the dashes have an aspect ratio of less than 5.

15. The sheet according to claim 1, wherein the polygonal cells are hexagonal cells.

16. The sheet according to claim 1, wherein the polygonal cells are octagonal cells.

17. The sheet according to claim 1, wherein the crenulated signature bosses are configured as two concentrically arranged hearts.

18. A roll of tissue exhibiting puffiness and bulk having a plurality of bosses formed therein comprising:

an array of stitch-shaped bosses forming a lattice of polygonal cells;

each said polygonal cell being centrally filled with a plurality of bosses forming one of a multiplicity of signature emboss patterns comprising at least a first signature emboss pattern and a second signature emboss pattern, said first signature emboss pattern being non-nesting with said second signature emboss pattern, said bosses being arrayed such that one of said first signature emboss patterns nests with another of said first signature emboss patterns at no more than three locations within said roll and one of said second signature emboss patterns nests with another of said second signature emboss patterns at no more than three locations within said roll.

19. The roll according to claim 18, wherein said bosses are configured such that substantial nesting of said signature bosses on a roll occurs at a maximum of two locations.

20. The roll according to claim 18, wherein said second signature emboss pattern is configured as two concentrically arranged hearts.

* * * * *